United States Patent
Rousseau et al.

(10) Patent No.: US 10,254,919 B2
(45) Date of Patent: Apr. 9, 2019

(54) ONE-CLICK TAGGING USER INTERFACE

(75) Inventors: Cedric Rousseau, Orsay (FR); Jerome Muffat-Meridol, Paris (FR)

(73) Assignee: Intel Corporation, Santa Clara, CA (US)

( * ) Notice: Subject to any disclaimer, the term of this patent is extended or adjusted under 35 U.S.C. 154(b) by 886 days.

(21) Appl. No.: 13/813,347

(22) PCT Filed: Jan. 30, 2012

(86) PCT No.: PCT/US2012/023178
§ 371 (c)(1),
(2), (4) Date: Nov. 3, 2014

(87) PCT Pub. No.: WO2013/115775
PCT Pub. Date: Aug. 8, 2013

(65) Prior Publication Data
US 2015/0177918 A1 Jun. 25, 2015

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04842* (2013.01); *G06F 17/3028* (2013.01); *G06F 17/30876* (2013.01); *G06Q 10/10* (2013.01)

(58) Field of Classification Search
None
See application file for complete search history.

(56) References Cited

U.S. PATENT DOCUMENTS

| 6,335,742 B1 * | 1/2002 | Takemoto | G06F 17/30274 386/225 |
| 6,629,104 B1 * | 9/2003 | Parulski | G06F 17/30265 348/231.2 |

(Continued)

FOREIGN PATENT DOCUMENTS

| CN | 1784647 A | 6/2006 |
| CN | 1866193 A | 11/2006 |

(Continued)

OTHER PUBLICATIONS

Office Action received for Japanese Patent Application No. 2013-14220, dated Oct. 16, 2014, 9 pages including 5 pages of English translation.

(Continued)

*Primary Examiner* — William C Trapanese
(74) *Attorney, Agent, or Firm* — Jordan IP Law, LLC

(57) ABSTRACT

Methods and systems may provide for identifying a first user selection of one or more objects in an interface, and determining a tag associated with a second user selection. The first user selection can be a single-click selection and the second user selection may correspond to one of a tagged object and a tag. In addition, a tag relationship may be created between the one or more objects of the first user selection and the tag associated with the second user selection. If the second user selection is previous to the first user selection, the tag relationship can be created in response to the first user selection. If the second user selection is subsequent to the first user selection, the tag relationship may be created in response to the second user selection.

34 Claims, 2 Drawing Sheets

(51) Int. Cl.
  *G06Q 10/10* (2012.01)
  *G06F 17/30* (2006.01)
  *G06F 3/0484* (2013.01)

(56) References Cited

U.S. PATENT DOCUMENTS

| | | | |
|---|---|---|---|
| 7,010,751 B2 * | 3/2006 | Shneiderman | G06F 17/241 |
| | | | 707/999.004 |
| 7,636,450 B1 | 12/2009 | Bourdev | |
| 7,813,557 B1 | 10/2010 | Bourdev | |
| 7,831,913 B2 | 11/2010 | MacLaurin | |
| 2003/0156138 A1 * | 8/2003 | Vronay | G06Q 10/109 |
| | | | 715/772 |
| 2008/0298766 A1 * | 12/2008 | Wen | G06F 17/30259 |
| | | | 386/282 |
| 2010/0058163 A1 * | 3/2010 | Garcia-Molina | G06F 17/2258 |
| | | | 715/220 |
| 2011/0231747 A1 | 9/2011 | Zuckerberg et al. | |
| 2012/0023436 A1 | 1/2012 | Brown et al. | |
| 2012/0151398 A1 * | 6/2012 | Foy | G06F 17/30268 |
| | | | 715/769 |

FOREIGN PATENT DOCUMENTS

| | | |
|---|---|---|
| CN | 101387938 A | 3/2009 |
| CN | 102081496 A | 6/2011 |
| CN | 102132244 A | 7/2011 |
| CN | 102187303 A | 9/2011 |
| JP | 2009-277191 A | 11/2009 |
| JP | 2009277191 A | 11/2009 |
| TW | 201104587 A | 2/2011 |
| WO | 2013/115775 A1 | 8/2013 |

OTHER PUBLICATIONS

Office Action for Chinese Patent Application No. 201310035167.7, dated Sep. 30, 2016, 33 pages including 16 pages of English translation.

Office Action received for Japanese Patent Application No. 2013-014220, dated Jan. 28, 2014, 6 pages of office action including 3 pages of English Translation.

FD Blog, "Photo management by using the tags in Picasa", 14 pages, including 9 pages of translation, retrieved on Apr. 7, 2014 from http://blog.fujidenki.org/archives/896.html.

Office action received for Korean Patent Application No. 2013-0010010, dated Feb. 24, 2014, 3 pages of English Translation Only.

Office Action for Chinese Patent Application No. 201310035167.7, dated Apr. 21, 2016, 28 pages including 15 pages of English translation.

Office Action received for Taiwanese Patent Application No. 102101334, dated Feb. 9, 2015, 14 pages including 8 pages of English translation.

Fujidenki, "Photo Management by Using the Tags in Picasa", FD Blog PC Support, 2011, 10 pages including 5 pages of English translation, blog.fujidenki.org, retrieved from <http://blog.fujidenki.org/archives/896.html>.

Office Action and Search Report received for Chinese Patent Application No. 20130035167.7, dated Sep. 6, 2015, 39 pages including 23 pages of English translation.

International Search Report and Written Opinion for International PCT Application No. PCT/US2012/023178, dated Sep. 26, 2012, 10 pages.

Notice of Allowance received for Korean Patent Application No. 2013-0010010, dated Sep. 26, 2014, 2 Pages of Notice of Allowance and 1 Page of English Translation.

International Preliminary Report on Patentability and Written Opinion received for PCT Patent Application No. PCT/US2012/023178, dated Aug. 14, 2014, 7 Pages.

Office Action for Chinese Patent Application No. 201310035167.7, dated Mar. 1, 2017, 26 pages including 10 pages of English translation.

* cited by examiner

ONE-CLICK TAGGING USER INTERFACE

RELATED APPLICATIONS

This application is a United States national stage application claiming priority to PCT patent application serial no. PCT/US2012/023178, filed on 30 Jan. 2012.

BACKGROUND

Technical Field

Embodiments generally relate to tagging objects in media content. More particularly, embodiments relate to the implementation of one-click tagging user interfaces.

Discussion

Tagging photos may involve applying text labels to faces in the photos so that the text labels can enrich the photo's metadata for future data mining. In conventional manual tagging solutions, a user might enter tag information for each face in a photo. In conventional automated solutions, on the other hand, facial recognition algorithms may attempt to identify individuals in the photo. While such solutions may be suitable under certain circumstances, there remains considerable room for improvement. For example, conventional manual solutions can be time consuming, particularly for instances in which a large number of faces are involved, and conventional automated solutions may be limited by the ability of facial recognition algorithms to identify individuals in sub-optimal conditions (e.g., painted faces, disguised faces, etc.).

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is an illustration of an example of an interface according to an embodiment;

DETAILED DESCRIPTION

Figure 2A:
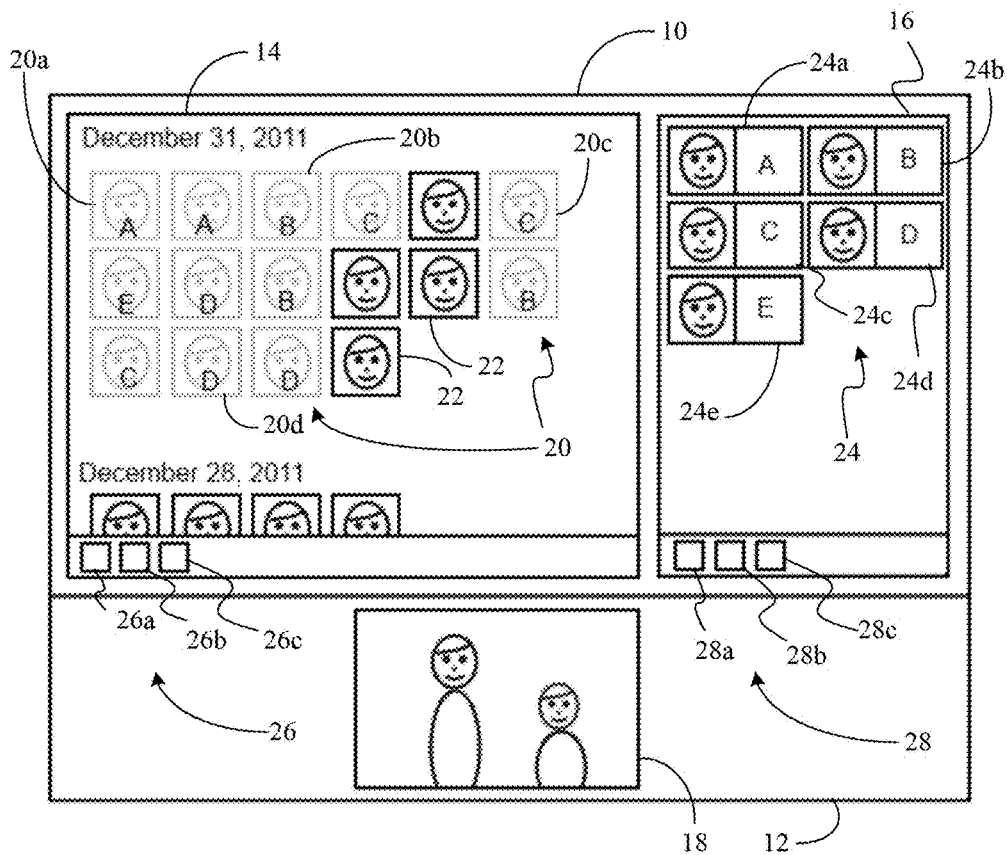
FIG. 2A is a flowchart of an example of a method of tagging objects according to an embodiment.

Turning now to FIG. 1, an interface 10 is shown in which various media content objects are presented to a user for tagging and review. In general, the illustrated interface 10 includes a database section/view 12, an object view 14 and a tag view 16. The database view 12 may show the media content 18 (e.g., photos, video, documents, presentations, web pages, etc.), whereas one or more objects extracted from the media content 18 can be displayed in the object view 14. In addition, any tags 24 (24a-24e) that have been created may be displayed in the tag view 16. In the illustrated example, the object view 14 contains tagged objects 20 (20a-20d) as well as untagged objects 22. For example, the illustrated tagged object 20a has been labeled with the "A" tag 24a (e.g., Alex), whereas the illustrated tagged object 20b has been labeled with the "B" tag 24b (e.g., Bob).

Although the objects 20, 22 are shown as faces, the objects 20, 22 may also be other items of interest such as cars, flowers, logos, text, and so forth. In this regard, the underlying system may conduct a preliminary analysis of the media content 18 to identify the locations (e.g., candidate face regions) of the objects 20, 22 in the media content 18 and extract them from the media content 18, whereas the actual recognition of the objects 20, 22 is conducted by the user, in the example shown. The tagged objects 20 may be distinguished visually from the untagged objects 22 by graying out the tagged objects 20 or by using another appropriate appearance modification technique such as highlighting, animation, size changes, color changes, and so forth. The tagged objects 20 and the untagged objects 22 may also be selectively hidden from view.

As will be discussed in greater detail, the tags 24 may be applied to the objects 20, 22 in a unique fashion that is fast, intuitive, user friendly, and reliable. In particular, one or more single/one-click selections can be used to label the objects 20, 22 with the tags 24, wherein a "click" may represent a mouse click, finger touch, etc., depending upon the particular hardware configuration in use. Essentially, the single-click selections may lead to the automatic creation of tag relationships based on either previous user selections or subsequent user selections.

Previous User Selections:

For example, in order to label one of the untagged objects 22 with the "D" tag 24d, the user may simply touch (e.g., in the case of a touch sensitive screen) the desired untagged object 22 after selecting the D tag 24d (wherein the selection of the D tag would constitute a previous user selection). The same would be true if the user wanted to assign the D tag 24d to one or more of the tagged objects 20. Indeed, the user could quickly assign the tag 24d to each of the four untagged objects 22 with four successive touches, in the example shown. Alternatively, the user may touch the untagged objects 22 after touching the tagged object 20d in order to duplicate the same tag relationship for the selected untagged objects 22. Such a single-click approach may be significantly less time consuming than conventional manual tagging solutions and can be more reliable than conventional automated tagging solutions in sub-optimal conditions from an object recognition standpoint.

Subsequent User Selections:

Another approach to labeling one or more of the tagged objects 22 with the D tag 24d would be to touch the desired untagged objects 22, in order to select them (while no tag is current), and then touch the D tag 24d to apply the "D" label to the desired untagged objects 22 all at once. As in the example above, the user may select a large number of untagged objects 22 in this fashion. Alternatively, the user may select the desired untagged objects 22, and subsequently touch the tagged object 20d in order to duplicate the same tag relationship for the selected untagged objects 22 all at once. Again, such a single-click approach may be significantly less time consuming than conventional manual tagging solutions and can be more reliable than conventional automated tagging solutions.

FIG. 2A shows a method 30 of tagging objects. The method 30 may be implemented as a set of executable logic instructions stored in at least one machine- or computer-readable storage medium such as random access memory (RAM), read only memory (ROM), programmable ROM (PROM), flash memory, firmware, microcode, etc., in configurable logic such as programmable logic arrays (PLAs), field programmable gate arrays (FPGAs), complex programmable logic devices (CPLDs), in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 30 may be written in any combination of one or more programming languages, including an object oriented programming language such as C++ or the like and conventional procedural programming languages, such as the "C" programming language or similar programming languages. Moreover, various aspects of the method 30 could be implemented as embedded logic of a processor using any of the aforementioned circuit technologies.

Illustrated processing block 32 provides for identifying a user selection (e.g., "first" user selection) of one or more objects. As already noted, the user selection may include one or more single-click selections, wherein each single-click selection corresponds to an object. A tag associated with another user selection (e.g., "second" user selection) may be determined at block 34. The second user selection, which may occur either prior/previous to or subsequent to the first user selection, can correspond to a tagged object or a tag. Block 36 may create a tag relationship between the one or more objects of the first user selection and the tag associated with the second user selection. Thus, if the second user selection is previous to the first user selection, the tag relationship may be created in response to the first user selection. If, on the other hand, the second user selection is subsequent to the first user selection, the tag relationship can be created in response to the second user selection. The created tag relationship may also be stored to non-volatile memory (NVM) so that they are persistent immediately. As will be discussed in greater detail, creating the tag relationship may involve deleting a previous tag relationship, wherein the deletion may also be reflected in the NVM.

Reviewing Tag Relationships:

Returning now to FIG. 1, the illustrated approach may also provide an enhanced solution to reviewing previously assigned tags. In particular, in order to see all of the objects that have been labeled with a particular tag, the user need only select the tag in question. For example, if the user selects the "C" tag 24c in the tag view 16, the illustrated interface 10 will automatically modify the appearance of the labeled object 20c (and any other objects having that label) to indicate to the user that the C tag 24c has been assigned to that labeled object 20c. As already noted, the appearance modification may include highlighting, animating, changing the size of, changing the color of, etc., the selected objects and tag. Similarly, if the user selects the "B" tag 24b in the tag view 16, the interface 10 may automatically modify the appearance of the labeled object 20b (and any other objects having that label) to indicate to the user that the B tag 24b has been assigned to the labeled object 20b. In addition, if no tag is current and the user touches a tagged object 20, then its tag becomes current. For example, clicking the tagged object 20d is the same as clicking the tag 24d, in the example shown.

Figure 2B:
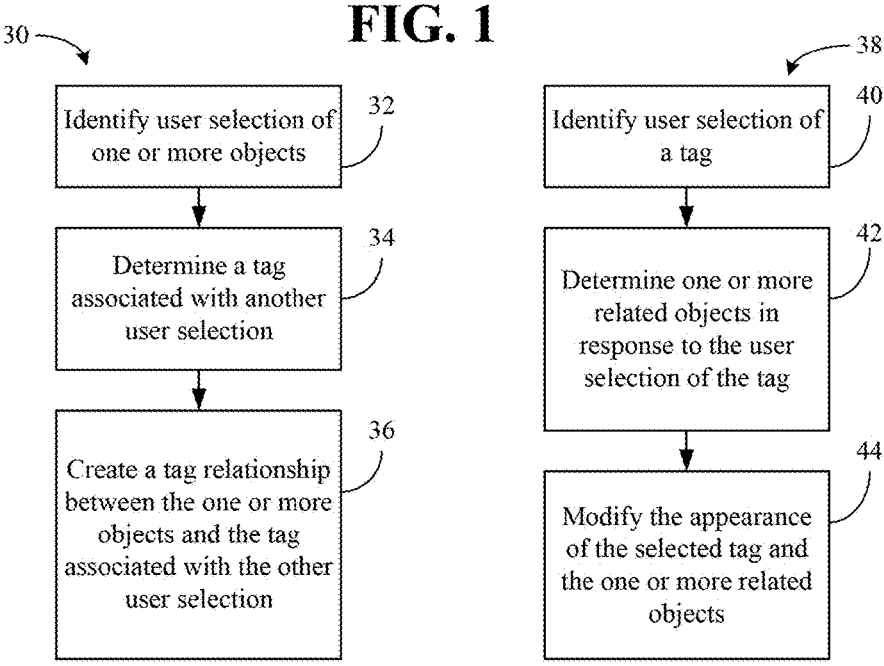
FIG. 2B is a flowchart of an example of a method of viewing tagged objects according to an embodiment.

FIG. 2B shows a method 38 of viewing tagged objects. The method 38 may be implemented as a set of executable logic instructions stored in at least one machine- or computer-readable storage medium such as RAM, ROM, PROM, flash memory, firmware, microcode, etc., in configurable logic such as PLAs, FPGAs, CPLDs, in fixed-functionality hardware using circuit technology such as ASIC, CMOS or TTL technology, or any combination thereof. Illustrated processing block 40 provides for identifying a user selection (e.g., a "third" user selection) of a tag, wherein one or more related objects may be determined at block 42 in response to the user selection of the tag. In addition, block 44 may provide for modifying the appearance of the selected tag and the one or more related objects so as to indicate to the user that a tag relationship exists therebetween.

Button Functions:

Returning again to FIG. 1, the illustrated object view 14 includes a set of soft buttons 26 (26a-26c) that facilitate management and manipulation of the objects 20, 22 by the user. In particular, an extract button 26a may be used to launch an extraction of features in the database containing the media content 18. Thus, the extract button 26a might initiate a candidate face region detection process. Additionally, a first hide button 26b can be used to hide the tagged objects 20, and a second hide button 26c can be used to hide any object that is not labeled with the current tag.

The tag view 16 may also include a set of soft buttons 28 (28a-28c) that facilitate management and manipulation of the tags 24 by the user. In particular, a create button 28a may be used to create a new tag and label the objects of interest that are currently selected, an edit button 28b can be used to change the text of the current tag, and a delete button 28c may be used to delete the current tag and remove its label from each object tagged with that label.

Both the illustrated object view 14 and the illustrated tag view 16 are scrollable by "flicking" the respective content up or down. The database view 12 may automatically zoom into and out of media content in the underlying database in response to scrolling operations performed in the object view 14.

Another advantageous feature is the ability to automatically delete previous tag relationships. For example, if the tagged object 20a is touched while the "E" tag 24e is selected, the relationship to the "A" tag 24a can be deleted in addition to creating the "E" tag 24e relationship with the tagged object 20a. Moreover, if a tag is selected and the user touches an object that is labeled with that tag, then the object may be deselected and either unlabeled or labeled with its previous tag. For example, if the user touches the tagged object 20a while the "A" tag 24a is selected, the relationship to the "A" tag 24a may be deleted and replaced with either a previously assigned tag for the tagged object 20a or no tag (e.g., if no previously assigned tag exists).

Figure 3:
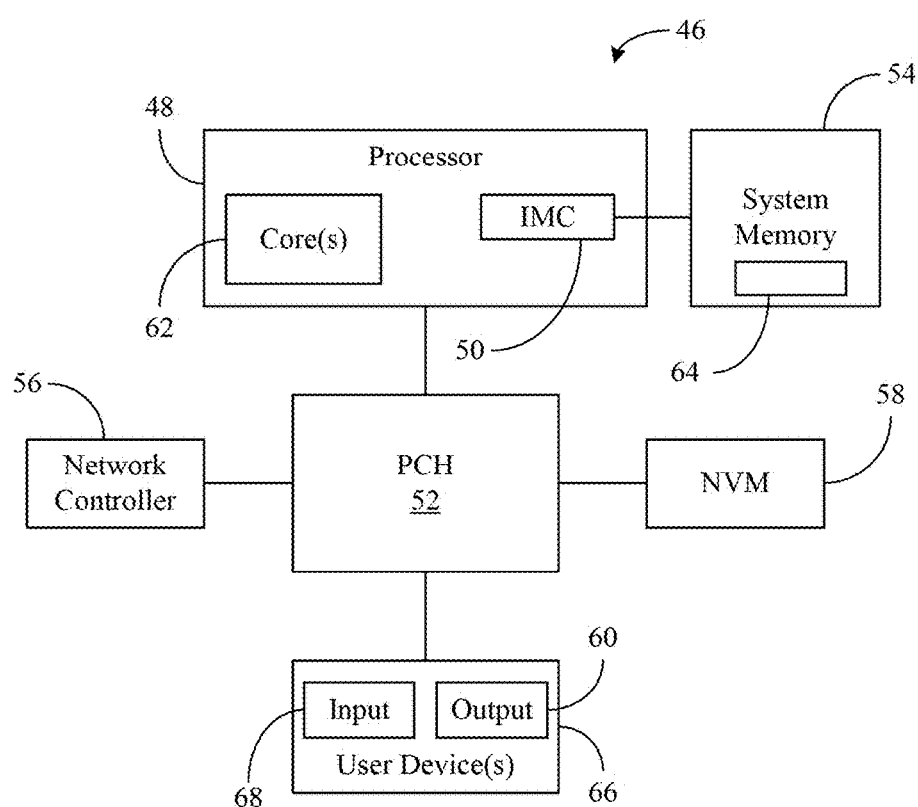
FIG. 3 is a block diagram of an example of a computing system according to an embodiment.

FIG. 3 shows a computing system/platform 46 that may be part of a mobile device having computing functionality (e.g., personal digital assistant/PDA, laptop, desktop, smart tablet), communications functionality (e.g., wireless smart phone), imaging functionality, media playing functionality (e.g., smart television/TV), or any combination thereof (e.g., mobile Internet device/MID). In the illustrated example, the platform 46 includes a processor 48, an integrated memory controller (IMC) 50, a platform controller hub (PCH) 52, system memory 54, a network controller (e.g., network interface card) 56, NVM 58, and one or more user devices 60. The processor 48 could alternatively communicate with an off-chip variation of the IMC 50, also known as a Northbridge, via a front side bus or a point-to-point fabric that interconnects each of the components in the platform 46. The processor 48, which may include a core region with one or several processor cores 62, may execute logic instructions 64 to implement a user interface such as the interface 10 (FIG. 1), as already noted. In particular, the user devices 60 may be capable of enabling a user to interact with and perceive the interface from the platform 46.

Thus, an output component (e.g., monitor, screen) 66 may display the interface, whereas, an input component (e.g., touch screen sensor array, mouse) 68 may detect a first user selection of one or more objects in the interface. When executed, the illustrated logic instructions 64 identify the first user selection of the one or more objects, determine a tag associated with a second user selection, and create a tag relationship between the one or more objects and the tag associated with the second user selection.

The illustrated PCH 52, sometimes referred to as a Southbridge or South Complex of a chipset, functions as a host controller and communicates with the network controller 56, which could provide off-platform communication functionality for a wide variety of purposes such as, for example, cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The PCH 52 may also include one or more wireless hardware circuit blocks to support such functionality.

The NVM 58 may include one or more hard disk drive (HDD) devices, solid state disk (SSD) NAND chips, etc., and might be used to provide high capacity data storage and/or a significant amount of parallelism. The NVM 58 can be used to store tag relationships, as already noted. There may also be solutions that include NAND controllers implemented as separate ASIC controllers being connected to the PCH 52 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. The NVM 58 could also be used as a USB (Universal Serial Bus, e.g., USB Specification 3.0, USB Implementers Forum) flash storage device.

Embodiments may therefore provide for a computer implemented method in which a first user selection of one or more objects in an interface is identified. The method can also involve determining a tag associated with a second user selection, and creating a tag relationship between the one or more objects and the tag associated with the second user selection.

Embodiments may also include a computer readable storage medium having a set of instructions which, if executed by a processor, cause a computer to identify a first user selection of one or more objects in an interface. The instructions can also cause a computer to determine a tag associated with a second user selection, and create a tag relationship between the one or more objects and the tag associated with the second user selection.

Other embodiments can include a system having an output component to display an interface, and an input component to detect a first user selection of one or more objects in the interface. The system may also have logic to identify the first user selection of one or more objects in the interface, determine a tag associated with a second user selection, and create a tag relationship between the one or more objects and the tag associated with the second user selection.

In addition, embodiments may include a computer implemented method in which an interface having an object view and a tag view is provided. The method can also provide for identifying a first user selection of one or more objects in the object view of the interface, wherein the first user selection includes one or more single-click selections, and wherein each single-click selection corresponds to an object. A tag associated with a second user selection may be determined, wherein the second user selection corresponds to one of a tagged object in the object view of the interface and a tag in the tag view of the interface. Additionally, the method may provide for creating a tag relationship between the one or more objects and the tag associated with the second user selection. The tag relationship can be stored to a non-volatile memory, and an appearance of the one or more objects may be modified in response to the first user selection. Modification of the appearance of the one or more objects can indicate a selection of the one or more objects. The method may also provide for identifying a third single-click user selection of a tag in the tag view of the interface, and determining one or more related objects in the object view of the interface in response to the third single-click user selection. In addition, the method can involve modifying an appearance of the tag selected by the third single-click user selection and the one or more related objects in the object view.

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multi-processor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be functional, compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include at least one machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. A computer implemented method comprising:
providing an interface including an object view and a tag view;
identifying a first user selection of one or more objects in the object view of the interface, wherein the first user selection includes one or more single-click selections, and wherein each single-click selection corresponds to an object;
determining a tag associated with a second user selection, wherein the second user selection is to select a displayed tagged object in the object view of the interface that was previously labeled with the tag;
creating a tag relationship between the one or more objects and the tag associated with the second user selection;
storing the tag relationship to a non-volatile memory;
modifying an appearance of the one or more objects in response to the first user selection, wherein modification of the appearance of the one or more objects indicates a selection of the one or more objects;
identifying a third single-click user selection of a tag in the tag view of the interface;
determining one or more related objects in the object view of the interface in response to the third single-click user selection;
modifying an appearance of the tag selected by the third single-click user selection in the tag view and the one or more related objects in the object view;
deleting the tag relationship; and
automatically replacing the deleted tag relationship with a previously assigned tag relationship by associating a first object of the one or more objects with a previously assigned tag, wherein the previously assigned tag was previously associated with the first object, and then disassociated from the first object.

2. The method of claim 1, wherein the second user selection is previous to the first user selection and the tag relationship between the one or more objects and the tag associated with the second user selection is created in response to the first user selection.

3. The method of claim 1, wherein the second user selection is subsequent to the first user selection and the tag relationship between the one or more objects and the tag associated with the second user selection is created in response to the second user selection.

4. The method of claim 1, further including deleting a previous tag relationship of the one or more objects in the object view of the interface by creating the tag relationship between the one or more objects and the tag associated with the second user selection.

5. The method of claim 4, wherein deleting the previous tag relationship includes creating the tag relationship between the one or more objects and the tag associated with the second user selection using a second tag that is different from a first tag used to create the previous tag relationship.

6. The method of claim 1, further including initiating the deleting to delete the tag relationship between the one or more objects and the tag associated with the second user selection in response to a selection of the one or more objects used to create the tag relationship in the object view concurrent with a selection of the tag used to create the tag relationship in the tag view.

7. The method of claim 1, further comprising, prior to the deleting, creating another tag relationship between the first object and another tag associated with a user selection, disassociating the first object from the another tag to remove the another tag relationship, and in response to the disassociating the first object from the another tag, storing the another tag relationship as the previously assigned tag relationship;
wherein the automatically replacing includes referring to the stored previously assigned tag relationship; and
wherein deleting the tag relationship results in another of the one or more objects lacking an association with any tag.

8. A system comprising:
an output component to display an interface including an object view and a tag view;
an input component to detect a first user selection of one or more objects in the object view of the interface; and
logic, including one or more of configurable logic or fixed-functionality hardware, to,
identify the first user selection of the one or more objects in the object view of the interface,
determine a tag associated with a second user selection, wherein the second user selection is to be a displayed tagged object in the object view of the interface that was previously labeled with the tag or a tag from the tag view;
create a tag relationship between the one or more objects and the tag associated with the second user selection;
delete the tag relationship; and
automatically replace the deleted tag relationship with a previously assigned tag relationship through an association of a first object of the one or more objects with a previously assigned tag, wherein the previously assigned tag was previously associated with the first object, and then disassociated from the first object.

9. The system of claim 8, wherein the second user selection is to be previous to the first user selection and the tag relationship between the one or more objects and the tag associated with the second user selection is to be created in response to the first user selection.

10. The system of claim 8, wherein the second user selection is to be subsequent to the first user selection and the tag relationship between the one or more objects and the tag associated with the second user selection is to be created in response to the second user selection.

11. The system of claim 8, wherein the logic is to modify an appearance of the one or more objects in response to the first user selection.

12. The system of claim 11, wherein modification of the appearance of the one or more objects is to indicate a selection of the one or more objects.

13. The system of claim 8, wherein the input component is to detect a third user selection of a tag in the tag view of the interface and the logic is to,
identify the third user selection of the tag in the tag view of the interface,
determine one or more related objects in the object view of the interface in response to the third user selection of the tag in the tag view, and
modify an appearance of the tag selected by the third user selection in the tag view and the one or more related objects in the object view of the interface.

14. The system of claim 8, further including non-volatile memory, wherein the logic is to store the tag relationship to the non-volatile memory.

15. The system of claim 8, wherein the logic is to delete a previous tag relationship of the one or more objects in response to the first user selection.

16. The system of claim 8, wherein the first user selection is to be one or more single-click selections, and wherein each single-click selection is to correspond to an object.

17. A non-transitory computer readable storage medium comprising a set of instructions which, if executed by a processor, cause a computer to:
identify a first user selection of one or more objects in an object view of an interface;
determine a tag associated with a second user selection, wherein the second user selection is to be a displayed tagged object in the object view of the interface that was previously labeled with the tag or a tag from a tag view of the interface;
create a tag relationship between the one or more objects and the tag associated with the second user selection;
delete the tag relationship; and
automatically replace the deleted tag relationship with a previously assigned tag relationship through an association of a first object of the one or more objects with a previously assigned tag, wherein the previously assigned tag was previously associated with the first object, and then disassociated from the first object.

18. The medium of claim 17, wherein the second user selection is to be previous to the first user selection and the tag relationship between the one or more objects and the tag associated with the second user selection is to be created in response to the first user selection.

19. The medium of claim 17, wherein the second user selection is to be subsequent to the first user selection and the tag relationship between the one or more objects and the tag associated with the second user selection is to be created in response to the second user selection.

20. The medium of claim 17, wherein the instructions, if executed, cause a computer to modify an appearance of the one or more objects in response to the first user selection.

21. The medium of claim 20, wherein modification of the appearance of the one or more objects is to indicate a selection of the one or more objects.

22. The medium of claim 17, wherein the instructions, if executed, cause a computer to:
identify a third user selection of a tag in the tag view of the interface;
determine one or more related objects in the object view of the interface in response to the third user selection of the tag in the tag view; and
modify an appearance of the tag selected by the third user selection in the tag view and the one or more related objects in the object view of the interface.

23. The medium of claim 17, wherein the instructions, if executed, cause a computer to store the tag relationship to a non-volatile memory.

24. The medium of claim 17, wherein the instructions, if executed, cause a computer to delete a previous tag relationship of the one or more objects in response to the first user selection.

25. The medium of claim 17, wherein the first user selection is to be one or more single-click selections, and wherein each single-click selection corresponds to an object.

26. A computer implemented method comprising:
identifying a first user selection of one or more objects in an object view of an interface;
determining a tag associated with a second user selection, wherein the second user selection is to be a displayed tagged object in the object view of the interface that was previously labeled with the tag or a tag from a tag view of the interface;
creating a tag relationship between the one or more objects and the tag associated with the second user selection;
deleting the tag relationship; and
automatically replacing the deleted tag relationship with a previously assigned tag relationship by associating a first object of the one or more objects with a previously assigned tag, wherein the previously assigned tag was previously associated with the first object, and then disassociated from the first object.

27. The method of claim 26, wherein the second user selection is previous to the first user selection and the tag relationship between the one or more objects and the tag associated with the second user selection is to be created in response to the first user selection.

28. The method of claim 26, wherein the second user selection is subsequent to the first user selection and the tag relationship between the one or more objects and the tag associated with the second user selection is to be created in response to the second user selection.

29. The method of claim 26, further including modifying an appearance of the one or more objects in response to the first user selection.

30. The method of claim 29, wherein modification of the appearance of the one or more objects indicates a selection of the one or more objects.

31. The method of claim 26, further including:
identifying a third user selection of a tag in the tag view of the interface;
determining one or more related objects in the object view of the interface in response to the third user selection of the tag in the tag view; and
modifying an appearance of the tag selected by the third user selection in the tag view and the one or more related objects in the object view of the interface.

32. The method of claim 26, further including storing the tag relationship to a non-volatile memory.

33. The method of claim 26, further including deleting a previous tag relationship of the one or more objects in response to the first user selection.

34. The method of claim 26, wherein the first user selection is one or more single-click selections, and wherein each single-click selection corresponds to an object.

* * * * *